United States Patent [19]

Gabas et al.

[11] Patent Number: 5,261,292
[45] Date of Patent: Nov. 16, 1993

[54] SELF-ADJUSTMENT DEVICE FOR ADUSTING THE LENGTH OF CONTROL CABLES

[75] Inventors: Carlos Gabas, Barcelona; Agustin Roca, Rubi, both of Spain

[73] Assignee: Pujol y Tarrago S.A., Rubi, Spain

[21] Appl. No.: 809,472

[22] PCT Filed: Apr. 9, 1991

[86] PCT No.: PCT/ES91/00019
  § 371 Date: Jan. 3, 1992
  § 102(e) Date: Jan. 3, 1992

[87] PCT Pub. No.: WO91/17365
  PCT Pub. Date: Nov. 14, 1991

[30] Foreign Application Priority Data

May 7, 1990 [ES] Spain .................... 9001269

[51] Int. Cl.⁵ ............................... F16C 1/10
[52] U.S. Cl. ........................ 74/501.5 R; 74/500.5; 74/502; 74/502.6
[58] Field of Search ........... 74/500.5, 501.5 R, 501.6, 74/502, 502.4, 502.6; 403/12, 197, 194; 192/111 A

[56] References Cited

U.S. PATENT DOCUMENTS

| | | | |
|---|---|---|---|
| 4,753,123 | 6/1988 | Stormont | 74/500.5 |
| 4,762,017 | 8/1988 | Jaksic | 74/500.5 |
| 4,841,805 | 6/1989 | Italiano | 74/500.5 X |
| 4,872,367 | 10/1989 | Spease | 74/502.4 X |
| 4,903,541 | 2/1990 | Shiota | 74/502.6 X |
| 5,098,214 | 3/1992 | Solano | 74/500.5 X |

FOREIGN PATENT DOCUMENTS

| | | | |
|---|---|---|---|
| 0120616 | 10/1984 | European Pat. Off. | 74/501.5 R |
| 0234864 | 9/1987 | European Pat. Off. | 74/501.5 R |
| 0342143 | 11/1989 | European Pat. Off. | 74/501.5 R |
| 0397008 | 11/1990 | European Pat. Off. | 74/501.5 R |
| 0159408 | 6/1990 | Japan | 74/501.5 R |
| 1382678 | 3/1988 | U.S.S.R. | 74/501.5 R |

Primary Examiner—Vinh T. Luong
Attorney, Agent, or Firm—Michael J. Striker

[57] ABSTRACT

A control cable length self-adjusting device has a main body member, a mechanical retaining unit arranged in the main body member, an adjusting stud extending through the mechanical retaining unit and provided with a unit allowing it to be attached to a fixed point of a motor vehicle structure. The adjusting stud has an external retaining thread for snugly receiving at its one end an end of a sheath of a steel cable to which it is attached so that the steel cable is slidable with strips of the sheath longitudinally through the adjusting studs. A perimetral flange is arranged at the cable. A control spring is arranged coaxially relative to the adjusting stud and bears permanently against the main body member and the perimetral flange. The main body member is substantially parallelepipedic, hollow and open at two opposite sides. The main body member has an extension provided with an inner bore for the adjusting stud and attachable to a fixed point to a motor vehicle structure. The main body member also has a through hole provided on its own side and spaced from the inner bore. The main body member also has on an opposite side two spaced apart through holes which face the inner bore and the through hole on its one end. The main body member also has two faces and a free end closest to the extension and is provided with recessed portions in the faces.

5 Claims, 1 Drawing Sheet

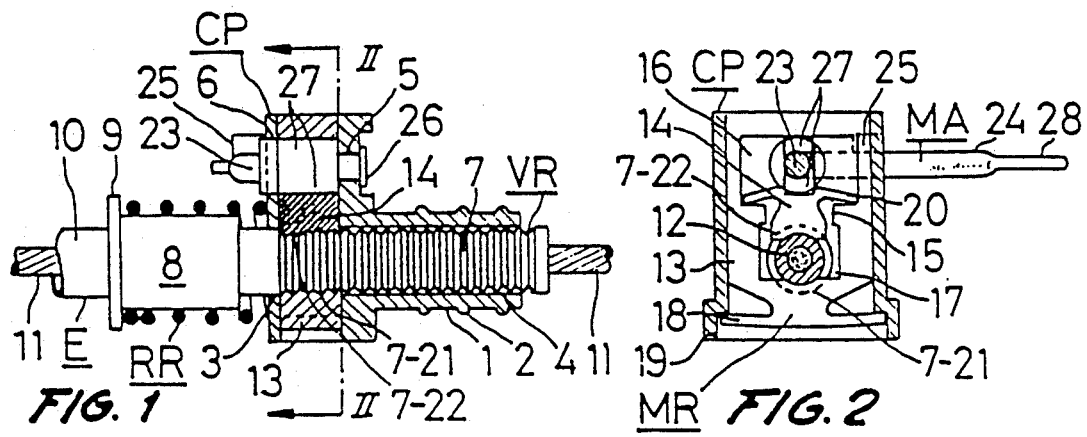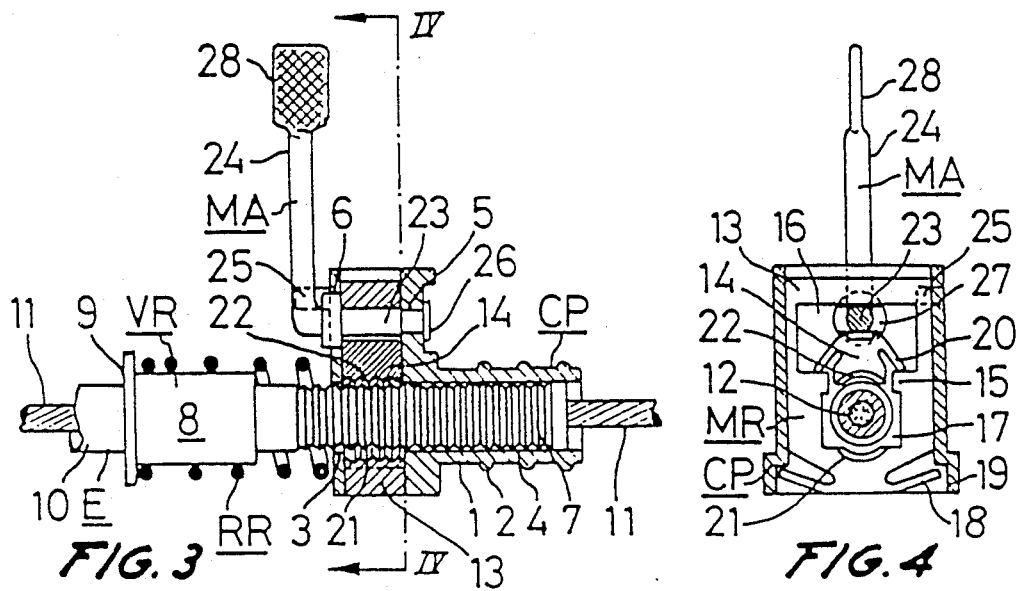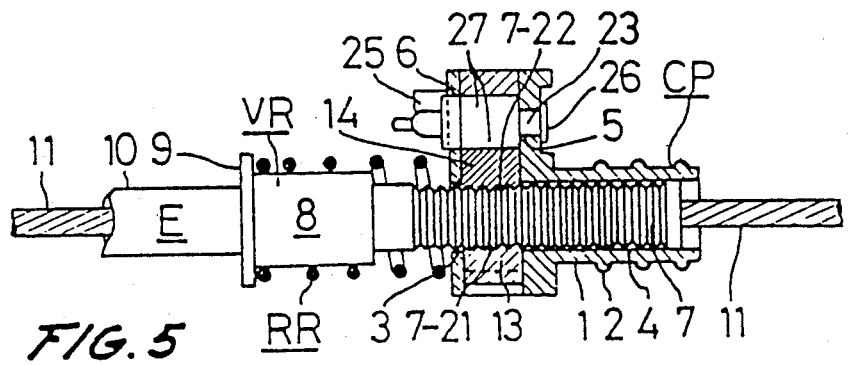

SELF-ADJUSTMENT DEVICE FOR ADUSTING THE LENGTH OF CONTROL CABLES

BACKGROUND OF THE INVENTION

The present invention relates to a self-adjusting device for adjusting the length of control cables which, particularly, have steel cables provided with a sheath usually used in control and adjusting mechanisms and, in particular, in the automobile industry.

The use of self-adjusting devices which are disposed on the control cable itself and serve to adjust and set the length of sheathed steel cable extending between the mechanisms connected thereby is widely known in the automobile industry. The devices are used for example, in control cables for the clutch mechanism, the gear change mechanism, etc.

The purpose of the self-adjusting devices is to take up the tolerances in the distance between the points of connection of the control cables of the mechanisms connected thereby, during the assembly process of each vehicle in particular. Thereby the length of the control cables are adjusted and set precisely while they are being assembled in the vehicle.

Under these conditions, the control cables usually comprise, in addition to the regular connection terminals, a self-adjusting device allowing normally automatical adjustment of the length of the control cable in the portion where the steel cable is sheathed, once said control cable has been connected at both ends thereof to the corresponding mechanisms.

In this way, the known of control cable length self-adjusting devices comprise all or some of the following operative members. The devices have a main body member through which and adjusting stud may suitably slide. This is provided with a retaining screw thread and is firmly attached at one end to the sheath, of the steel cable. The cable, stripped of its sheath, may slide longitudinally through the adjusting stud. The main body member is provided with mechanical means allowing it to be attached to a fixed point of the motor vehicle structure. The devices also have retaining means disposed inside the main body member. These means operate on the adjusting stud so as to set the position thereof relative to the said fixed point.

The devices further have a control spring coaxially disposed relative to the adjusting stud. This spring bears permanently against the main body member and against the adjusting stud at the end attached to the steel cable sheath.

The above described self-adjusting devices are supplied originally with the control spring compressed. When both ends of the control cable ar attached to the points of connection of the mechanisms the cable joins together and the device main body member is attached to a fixed point on the vehicle structure, the adjusting stud is released from the retaining means and under the urging of the control spring it establishes the appropriate length of the sheathed cable between the adjusting stud and the corresponding mechanism. Thereafter the position of the adjusting stud is fixed again with the retaining means with the cable length being appropriately set in this way.

As an example of said control cable length self-adjusting devices, there may be cited Spanish patent P 8803905 for "Control cable tension self-adjusting device" which, providing the innovating features characterizing it, comprises all the operative elements succinctly described above.

Generally speaking, the known control cable length self-adjusting devices have as a main drawback the need to have recourse to tools for actuating the retaining means operating on the adjusting stud during the above described operations of adjusting and setting the control cable length. This causes notable difficulties which increase the cost of installation of the control cables, particularly in those cases in which the self-adjusting device is located, due to the design and/or location of the devices connected by the control cable, in points of the motor vehicle structure of difficult or limited access where the use of tools under appropriate conditions is not feasible.

The control cable length self-adjusting device of the invention has: a main body member suitably dimensioned snugly to house the mechanical retaining means operating on the adjusting stud disposed therethrough and having means allowing it to be attached to a fixed point of the motor vehicle structure; a adjusting stud externally formed with a retaining thread suitably dimensioned relative to the compressive or tensile stress to which it is subjected and which is dimensioned at one end thereof snugly to receive the end of the sheath of the steel cable to which it is firmly attached, said steel cable being capable of sliding, suitably stripped of the sheath, longitudinally through the adjusting stud, having at said end a perimetral flange against which the control spring bears; a control spring which, coaxially disposed relative to the adjusting stud bears permanently against the main body member and against the perimetral flange of the adjusting stud; wherein the main body member is essentially parallelepipedic, hollow, open on two opposite sides and formed, on one side thereof, with a through hole spaced apart at an appropriate distance to a centered perpendicular extension through the inner bore of which the adjusting stud may suitably slide and which is extended externally over a sufficient distance and the dimensions and external shape of which allow attachment of the main body member to a fixed point of the motor vehicle structure and, on the side opposite to the former, two spaced apart through holes respectively facing the said through holes and corresponding recessed portions, in the interior of the main body member at the free end closest to the said extension and on the two remaining faces.

The retaining means operating on the adjusting stud, which as has been described above are housed in the main body member, are formed by actuating means; a hollow, essentially parallelepipedic retaining body member open on two opposite sides and dimensioned so as to be able to slide snugly within the main body member and formed, at one longitudinal end thereof, with two opposite transverse notches defining corresponding angularly disposed fins dimensioned in correspondence with the recessed portions formed in the interior of the main body member and in which they are housed to act as a spring thereagainst, and internally, two facing projections which suitably disposed and dimensioned define respective housings, the one closer to the said transverse notches designed to allow snug passage therethrough of the adjusting stud and the other snugly to house a retaining spring and the actuating means; and an essentially parallelepipedic retaining spring having two extensions formed on two opposite sides thereof and which in angular disposition bear against the said facing projections, the retaining body member and the retaining spring having on the opposite faces thereof respective retaining threads dimensioned in correspondence with the retaining thread formed on the adjusting stud.

The actuating means comprise an actuating shaft which, suitably snugly disposed through the interior of the main body member and of the retaining body member, is prevented from sliding longitudinally by the action of a perimetral flange which is formed on the corresponding free end as a retainer and which is formed on the portion of the shaft positioned in the interior of the main body member and of the retaining body member with two diametral shoulders of suitable dimensions, either of which may act on the retaining spring so that the rotation of said shaft in a sufficient angular distance transversally to the axis defined by the adjusting stud causes, in one direction, the movement of the retaining body member and the retaining spring towards the adjusting stud, with the consequent fixation of the position occupied by the adjusting stud under the combined action of the retaining threads formed thereon, while rotation of the shaft in the opposite direction causes the retaining body member and the retaining spring to move away from the adjusting stud, thereby releasing it from the combined action of the retaining threads; an outer radial extension of the actuating shaft which suitably dimensioned and shaped is designed to facilitate actuation of the retaining means; and an abutment formed externally on the surface of the main body member facing the outer radial extension of the actuating shaft designed to fix the position of said outer radial extension in which the position of the adjusting stud is fixed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a cross section view of the device of the invention, the adjusting stud being in the original set position.

FIG. 2 is the view corresponding to the cross section II—II of FIG. 1.

FIG. 3 is a cross section view of the device of the invention, showing the position occupied by the adjusting stud during the adjustment of the length of the sheathed steel cable.

FIG. 4 is the view corresponding to the cross section IV—IV of FIG. 3.

FIG. 5 is a cross section view of the device of the invention, showing the position occupied by the adjusting stud once the length of the sheathed cable has been set.

DETAILED DESCRIPTION OF THE PREFERRED EMBODIMENT

A control cable length self-adjusting device described as an embodiment comprises, as shown in section in detail in FIGS. 1, 3 and 5 of the drawing sheet, the main body member CP suitably housing the adjusting stud VR, the retaining means MR and the device actuating means MA and the control spring RR external to the main body member CP.

The main body member CP, the retaining means MR and the actuating means AMA are made preferably from plastics materials having appropriate mechanical properties, while the adjusting stud VR is made, also preferably, from a metal.

As shown in all the Figures, the main body member CP is essentially parallelepipedic, hollow and open on two opposite sides and is provided on one of the sides with the cylindrical extension 1, shown in FIGS. 1, 3 and 5. Three perimentral ribs 2 suitably separated and dimensioned are formed on the extension 1. The cylindrical extension 1 and the perimetral ribs 2 are designed for attaching the main body member CP to a fixed point on the motor vehicle structure which, for greater clarify of description, has not been shown in the drawing sheet.

The main body member CP is provided with the through hole 3 facing the longitudinal through bore 4 of the cylindrical extension 1, so that the adjusting stud VR may slide snugly therethrough as shown in FIGS. 1, 3 and 5.

The main body member CP is also provided with facing through holes 5 and 6 placed at a higher level than the said through holes 3 and 4. The former are suitably dimensioned so as to allow the passage therethrough of the actuating means MA, as shown in all the Figures.

The adjusting stud VR is provided on the outside thereof and over a sufficient length with the retaining thread 7 and, at one end thereof, with the housing 8 and the perimetral flange 9, as shown in FIGS. 1, 3 and 5. The housing 8 is designed snugly to receive and firmly fix the end E of the sheath 10 of the steel cable 11 and the end of the control spring RR presses constantly against the perimetral flange 9.

The longitudinal through bore 12, shown in FIGS. 2 and 4, of the adjusting stud VR is dimensioned such that the steel cable 11 may slide suitably snugly therethrough.

The retaining means MR are formed by the retaining body member 13 and by the retaining spring 14, both of essentially parallelepipedic shape as shown in detail in FIGS. 2 and 4.

The retaining body member 13 is dimensioned such that it may slide snugly in the interior of the main body member CP, is hollow. It open on two opposite sides and has two projections 15, shown in FIGS. 2 and 4, defining adjacent housings 16 and 17 for suitably containing the retaining spring 14 and the actuating means MA, and for containing the adjusting stud VR, respectively.

Externally the retaining body member 13 is formed with the two tabs 18 which, as shown in FIG. 4, are angled in the rest position thereof so that they may act as springs by pressing against the walls of the recessed portions 19 formed in the main body member CP as shown in FIG. 2.

The retaining spring 14 is formed with the two tabs 20 angularly disposed in a similar way to the tabs 18 formed on the retaining body member 13. The tabs 20 may act by pressing against the corresponding walls of the projections 15 formed in the retaining body member 13, as shown in detail in FIGS. 2 and 4.

All the drawing Figures show how the retaining body member 13 and the retaining spring 14 are provided with retaining threads 21 and 22, respectively. These are of sufficient dimensions and mate with the retaining thread 7 formed on the outside of the adjusting stud VR such that when the retaining spring 14 is suitably disposed in the housing 16 of the retaining body member 13, both retaining threads 21, 22 are facing each other.

The actuating means MA are formed by the actuating shaft 23, the radial extension 24 and by the positioning abutment 25, shown in all the drawing Figures.

The actuating shaft 23 is provided at the free end thereof with the perimetral flange 26 which, as shown in FIGS. 1, 3 and 5 acts as a retainer and prevents the actuating shaft 23 from coming away from the main body member CP and the retaining body member 13 once it has been inserted therein.

The actuating shaft 23 is formed, in the portion thereof passing through the main body member CP and the retaining body member 13, with two diametrally opposed shoulders 27, shown in detail in FIGS. 2 and 4, which may press against the retaining spring 14 as shown in detail in FIGS. 1 and 2.

The radial extension 24 consists, in this embodiment as shown in detail in FIG. 3, of an elbowed extension of . The actuating shaft 23,the free end of said radial extension 24 is formed with the widened portion 28 designed to facilitate the setting and adjustment operations inherent in the device of the invention for the user.

The positioning abutment 25 is designed to set the position of the radial extension 24 and, therefore, of the actuating shaft 23 once the position of the adjusting stud VR has been set thereby, as shown in FIGS. 1, 2 and 5. In this way the adjusting stud VR is prevented from coming loose extemporaneously during the operations prior to the mounting of the device of the invention or when it is mounted in the vehicle, with the consequent loss of adjustment of the control cable length.

The control cable length self-adjusting device of the invention operates as follows: the device is supplied originally as shown in FIG. 1. Under these conditions, the control spring RR is fully compressed and the adjusting stud VR is held by the combined action of the retaining body member 13 and the retaining spring 14 through their respective retaining threads 7, 21 and 22 as shown in FIG. 2. Once the device of the invention has been mounted at a fixed point on the motor vehicle structure and the mechanisms, not shown in the drawings for the reasons given hereinbefore, linked by the steel cable 11 have been attached to the respective ends thereof, transverse rotation of the actuating shaft 23 by a sufficient amount by means of the radial extension 24 and the widened portion 28 provided therefor, releases the adjusting stud VR from the retaining threads by the combined action of the two tabs 18 formed on the retaining body member 13 and the two tabs 20 formed on the retaining spring. These tabs press against the recessed portions 19 and projections 15 of the main body member CP and retaining member 13, respectively, thereby separating the retaining body member 13 and retaining spring 14 sufficiently away from the adjusting stud VR, as shown in FIGS. 3 and 4. The adjustment of the length of the portion of steel cable 11 provided with sheath 10 is effected by the action of the control spring RR which presses against the main body member CP and the perimetral flange 9 of the adjusting stud VR, moving the latter in a sufficient amount required by each particular application. Once the length of the control cable has been adjusted, a new rotation of the actuating shaft 23 by the radial extension 24 and widened portion 28 back to the initial position described above, will set the adjusting stud VR in the new position determined by the control spring RR by the action of the retaining body member 13 and retaining spring 14, the latter pressing against the shoulder 27 formed on said actuating shaft 23.

It will be understood that each of the elements described above, or two or more together, may also find a useful application in other types of constructions differing from the types described above.

While the invention has been illustrated and described as embodied in a self-adjustment device for adjusting the length of control cables, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A control cable length self-adjusting device, comprising a main body member; mechanical retaining means arranged in said main body member; an adjusting stud extending through said mechanical retaining means and provided with mounting means, said adjusting stud having an external retaining thread for snugly receiving an end of a sheath of a steel cable so that the steel cable is slidable stripped of the sheath longitudinally through said adjusting stud; a perimetral flange arrangeable at the cable; a control spring arranged coaxially relative to said adjusting stud and bearing permanently against said main body member and said perimetral flange, said main body member being substantially parallelepipedic, hollow and open at two opposite sides, said main body member having an extension provided with an inner bore for said adjusting stud, said main body member also having one side with a through hole provided on said one side and spaced from said inner bore, said main body member also having an opposite side and two spaced apart through holes which are provided on said opposite side and face said inner bore and said through hole, said main body member also having two faces and a free end closest to said extension and provided with recessed portions in said faces.

2. A control cable length self-adjusting device as defined in claim 1, wherein said retaining means includes actuating means, a hollow, essentially parallelepipedic retaining body member which is open on two opposite sides and dimensioned to slide snugly within said main body member, said retaining body member having one longitudinal end provided with two opposite transverse notches defining angularly disposed tabs which are dimensioned in correspondence with said recessed portions of said main body member and in which said tabs are housed to act as a spring, said retaining member also having two facing projections which are arranged to define housings which includes a first housing located closer to said transverse notches and formed to allow snug passage therethrough of said adjusting stud, and a second housing formed to snugly house said actuating means; an essentially parallelepipedic retaining spring snugly housed in said second housing and having two extensions which are formed on two opposite sides and disposed to bear against said facing projections.

3. A control cable length self-adjusting device as defined in claim 2, wherein said retaining body member and said retaining spring have opposite faces provided with retaining threads dimensioned in correspondence with said retaining thread of said adjusting stud.

4. A control cable length self-adjusting device as defined in claim 2, wherein said actuating means have an actuating shaft which is snugly disposed in said main body member and in said retaining body member, a shaft positioned in said main body member and in said retaining body member and having a flange preventing longitudinal sliding of said actuating shaft, said shaft having two diametrical shoulders acting on said retaining spring so that a rotation of said shaft over an angular distance transversely to said adjusting stud causes in one direction a movement of said retaining body member and said retaining spring toward said adjusting stud with a consequent fixation of a position occupied by said adjusting stud in view of a combined action of said retaining threads, while a rotation of said shaft in an opposite direction causes said retaining body member and said retaining spring to move away from said adjusting stud and thereby releasing it from the combined action of said retaining threads.

5. A control cable length self-adjusting device as defined in claim 9, wherein said shaft has an outer radial extension formed to facilitate an actuating of said retaining means, said main body member having an external surface provided with an abutment which faces said outer radial extension of said actuating shaft and formed to fix a position of said radial extension in which a position of said adjusting stud is fixed.

* * * * *